United States Patent
Suga et al.

(10) Patent No.: US 11,804,901 B2
(45) Date of Patent: Oct. 31, 2023

(54) DERIVATION METHOD, COMMUNICATION SYSTEM AND ACCOMMODATION STATION APPARATUS

(71) Applicant: NIPPON TELEGRAPH AND TELEPHONE CORPORATION, Tokyo (JP)

(72) Inventors: Mizuki Suga, Musashino (JP); Kota Ito, Musashino (JP); Yushi Shirato, Musashino (JP); Naoki Kita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 253 days.

(21) Appl. No.: 17/429,582

(22) PCT Filed: Jan. 31, 2020

(86) PCT No.: PCT/JP2020/003611
§ 371 (c)(1),
(2) Date: Aug. 9, 2021

(87) PCT Pub. No.: WO2020/166379
PCT Pub. Date: Aug. 20, 2020

(65) Prior Publication Data
US 2022/0140905 A1    May 5, 2022

(30) Foreign Application Priority Data
Feb. 15, 2019   (JP) ................................ 2019-025671

(51) Int. Cl.
*H04B 10/2575* (2013.01)
*H04B 7/06* (2006.01)
(Continued)

(52) U.S. Cl.
CPC ..... *H04B 10/25759* (2013.01); *H04B 7/0617* (2013.01); *H04B 7/0667* (2013.01);
(Continued)

(58) Field of Classification Search
CPC ............ H04B 10/25759; H04B 10/077; H04B 10/25754; H04B 7/0617; H04B 7/0667; H04W 16/26
(Continued)

(56) References Cited

U.S. PATENT DOCUMENTS 5,805,983 A * 9/1998 Naidu ...................... H01Q 3/26
                                                      455/503
11,146,351 B1  10/2021 Xu et al.
(Continued)

FOREIGN PATENT DOCUMENTS

JP        4246724 B2    4/2009

OTHER PUBLICATIONS

Dennis T. K. Tong et al., A Novel Multiwavelength Optically Controlled Phased Arrray Antenna with a Programmable Dispersion Matrix, IEEE Photonics Technology Letters, vol. 8, No. 6, Jun. 1996.
(Continued)

*Primary Examiner* — Dalzid E Singh
(74) *Attorney, Agent, or Firm* — Harness, Dickey & Pierce, P.L.C.

(57) ABSTRACT

A derivation method includes: a transmission step of transmitting, to a wireless terminal, a first radio-wave signal according to an optical signal with a first wavelength and a second radio-wave signal according to an optical signal with a second wavelength; a communication start time information acquisition step of acquiring information on a first communication start time and information on a second communication start time; a reception time information
(Continued)

acquisition step of acquiring information on a first reception time and information on a second reception time; a transmission time period derivation step of deriving a first round trip time and deriving a second round trip time; and an optical fiber length derivation step of deriving an optical fiber length, based on the first round trip time, the second round trip time, a group velocity or a group delay time of the optical signal with the first wavelength, and a group velocity or a group delay time of the optical signal with the second wavelength.

5 Claims, 8 Drawing Sheets

(51) Int. Cl.
  *H04B 10/077* (2013.01)
  *H04W 16/26* (2009.01)
(52) U.S. Cl.
  CPC ..... *H04B 10/077* (2013.01); *H04B 10/25754* (2013.01); *H04W 16/26* (2013.01)
(58) Field of Classification Search
  USPC ........................................................ 398/115
  See application file for complete search history.

(56) References Cited

U.S. PATENT DOCUMENTS

| | | | |
|---|---|---|---|
| 11,296,752 B2* | 4/2022 | Harel | H04W 16/02 |
| 2004/0096222 A1* | 5/2004 | Cagenius | H04B 17/19 |
| | | | 398/115 |
| 2006/0209800 A1* | 9/2006 | Lee | H04W 12/062 |
| | | | 370/352 |
| 2010/0041341 A1 | 2/2010 | Stratford | |
| 2013/0316730 A1 | 11/2013 | Ding | |
| 2013/0343755 A1* | 12/2013 | Cvijetic | H04J 14/0227 |
| | | | 398/45 |
| 2014/0314061 A1* | 10/2014 | Trajkovic | H04W 16/26 |
| | | | 370/338 |
| 2017/0279577 A1* | 9/2017 | Shekalim | H04W 64/00 |
| 2019/0109643 A1 | 4/2019 | Campos et al. | |
| 2022/0021456 A1 | 1/2022 | Otsuki et al. | |
| 2022/0141788 A1 | 5/2022 | Suga et al. | |
| 2022/0393764 A1 | 12/2022 | Ito et al. | |

OTHER PUBLICATIONS

Recommendation ITU-T G.650.3, Test methods for installed single-mode optical fibre cable links, 2017.
IEEE Std 802.3ah—2004.

* cited by examiner

DERIVATION METHOD, COMMUNICATION SYSTEM AND ACCOMMODATION STATION APPARATUS

CROSS-REFERENCE TO RELATED APPLICATIONS

This application is a 371 U.S. National Phase of International Application No. PCT/JP2020/003611 filed on Jan. 31, 2020, which claims priority to Japanese Application No. 2019-025671 filed on Feb. 15, 2019. The entire disclosures of the above applications are incorporated herein by reference.

TECHNICAL FIELD

The present invention relates to a derivation method, a communication system, and an accommodation station device.

BACKGROUND ART

In recent years, attention has turned to millimeter-wave band communication, which can use broader bandwidths than microwave bands, in order to meet the growing demand for wireless communication. However, since propagation loss increases according to radio signal frequencies in a wireless segment, a transmission distance of millimeter-wave band communication is shorter than a transmission distance of microwave band communication. Accordingly, a communication system for millimeter-wave band communication is capable of communication in a more limited area.

A method is proposed that expands an area by placing an antenna in such a manner that the antenna extends outward from a signal processing unit. According to the method, an accommodation station device including the signal processing unit is separated from the antenna by using a radio-over-fiber (RoF) technology. The antenna is placed as an extension station device, whereby an apparent coverage area is expanded.

According to the method, the coverage area is further expanded through point to multi point (P2MP), in which a plurality of antennas are connected to a single signal processing unit. Separation of the signal processing unit from the antennas is expected to bring about configurational simplification and power saving of the extension station devices, and cost merits. For a method for connecting the plurality of antennas to the single signal processing unit, a method using a passive optical network (PON) technology is considered.

Since propagation loss is large in a wireless segment, beamforming (BF) is used in millimeter-wave band communication in some cases. Radio waves are concentratedly radiated in a specified direction through beamforming, whereby power lost as propagation loss is compensated for. For the beamforming to be properly performed, a communication system needs to control directivity of radio waves (directivity control) by using a plurality of antenna elements.

Even if an extension station device does not include a signal processing unit, a signal processing unit of an accommodation station device needs to perform optical beamforming. A typical method for the optical beamforming is a method in which a signal processing unit forms a beam, according to a phase delay that occurs differently per wavelength due to wavelength dispersion in an optical fiber (see Patent Document 1, Non-Patent Document 1).

According to the method, in order to properly control directivity, the accommodation station device derives phase delays occurring in an optical fiber. To derive phase delays, the signal processing unit needs to estimate a length of the optical fiber (hereinafter, referred to as "optical fiber length").

Methods for estimating an optical fiber length include a method in which Optical Time Domain Reflectometry (OTDR) is used (see Non-Patent Document 2), and a method in which Round Trip Time (RTT) is used (see Non-Patent Document 3).

CITATION LIST

Patent Document

Patent Document 1: Japanese Patent No. 4246724

Non-Patent Documents

Non-Patent Document 1: Dennis T. K. Tong and Ming C. Wu, "A Novel Multiwavelength Optically Controlled Phased Array Antenna with a Programmable Dispersion Matrix," IEEE Photonics Technology Letters, vol. 8, no. 6, pp. 812-814, June 1996.
Non-Patent Document 2: Recommendation ITU-T G.650.3: "Test methods for installed single-mode optical fibre cable links," 2017.
Non-Patent Document 3: IEEE Std 802.3ah-2004.

SUMMARY OF THE INVENTION

Technical Problem

According to the method in which Optical Time Domain Reflectometry is used, an accommodation station device estimates an optical fiber length, based on a time period from when a pulse signal is transmitted to an extension station device until the pulse signal reflected by the extension station device returns to the accommodation station device. However, when an optical fiber forms a passive optical network (PON), the accommodation station device cannot identify which extension station device the pulse signal is reflected from, because a plurality of pulse signals reflected from a plurality of extension station devices are mixed up. Accordingly, the accommodation station device cannot estimate an optical fiber length.

According to the method in which Round Trip Time is used, an accommodation station device measures a time period taken by a signal to make a round trip (round trip time) between the accommodation station device and an extension station device, through a sequence called P2MP discovery. The accommodation station device estimates an optical fiber length, based on the measured round trip time. The extension station device transmits, to the accommodation station device, a frame in which an own identifier of the extension station device is embedded. The accommodation station device measures a round trip time between the accommodation station device and each extension station device, based on an identifier embedded in a frame received from the extension station device. However, according to the method in which Round Trip Time is used, since an extension station device needs to embed an own identifier of the extension station device into a frame, each extension station device needs to include a signal processing unit. Accordingly, the conventional accommodation station device cannot estimate an optical fiber length in some cases unless each extension station device includes a signal processing unit.

In view of the above-described circumstances, an object of the present invention is to provide a derivation method, a communication system, and an accommodation station device that make it possible to estimate an optical fiber length between an accommodation station device and an extension station device, without the extension station device including a signal processing unit.

Means for Solving the Problem

An aspect of the present invention is a derivation method performed by a communication system including an access point and a wireless terminal, the access point including an accommodation station device and an extension station device connected to each other through an optical fiber transmitting an optical signal, and the wireless terminal communicating with the extension station device by using a radio-wave signal, the derivation method including: a transmission step of transmitting, to the wireless terminal, a first radio-wave signal according to an optical signal with a first wavelength, and a second radio-wave signal according to an optical signal with a second wavelength; a communication start time information acquisition step of acquiring information on a first communication start time that is a time at which communication using the optical signal with the first wavelength is started in the accommodation station device, and information on a second communication start time that is a time at which communication using the optical signal with the second wavelength is started in the accommodation station device; a reception time information acquisition step of acquiring information on a first reception time that is a reception time related to the first radio-wave signal in the accommodation station device, and information on a second reception time that is a reception time related to the second radio-wave signal in the accommodation station device; a transmission time period derivation step of deriving a first round trip time that is a time period from the first communication start time until the first reception time, and deriving a second round trip time that is a time period from the second communication start time until the second reception time; and an optical fiber length derivation step of deriving a length of the optical fiber, based on the first round trip time, the second round trip time, a group velocity or a group delay time of the optical signal with the first wavelength, and a group velocity or a group delay time of the optical signal with the second wavelength.

Another aspect of the present invention is the derivation method, wherein the optical fiber length derivation step derives the length of the optical fiber, based on a difference between the first round trip time and the second round trip time, the group velocity or the group delay time of the optical signal with the first wavelength, and the group velocity or the group delay time of the optical signal with the second wavelength.

Another aspect of the present invention is the derivation method, wherein the optical fiber length derivation step derives the length of the optical fiber, based on a difference between the first round trip time and the second round trip time, the group velocity or the group delay time of the optical signal with the first wavelength, the group velocity or the group delay time of the optical signal with the second wavelength, a group velocity or a group delay time of an optical signal with a third wavelength, and a group velocity or a group delay time of an optical signal with a fourth wavelength.

Another aspect of the present invention is a communication system, including: an access point including an accommodation station device and an extension station device connected to each other through an optical fiber transmitting an optical signal; and a wireless terminal that communicates with the extension station device by using a radio-wave signal, wherein the accommodation station device includes a transmission unit that transmits, to the wireless terminal, a first radio-wave signal according to an optical signal with a first wavelength, and a second radio-wave signal according to an optical signal with a second wavelength, a communication start time information acquisition unit that acquires information on a first communication start time that is a time at which communication using the optical signal with the first wavelength is started in the accommodation station device, and information on a second communication start time that is a time at which communication using the optical signal with the second wavelength is started in the accommodation station device, a reception time information acquisition unit that acquires information on a first reception time that is a reception time related to the first radio-wave signal in the accommodation station device, and information on a second reception time that is a reception time related to the second radio-wave signal in the accommodation station device, a transmission time period derivation unit that derives a first round trip time that is a time period from the first communication start time until the first reception time, and derives a second round trip time that is a time period from the second communication start time until the second reception time, and an optical fiber length derivation unit that derives a length of the optical fiber, based on the first round trip time, the second round trip time, a group velocity or a group delay time of the optical signal with the first wavelength, and a group velocity or a group delay time of the optical signal with the second wavelength.

Another aspect of the present invention is an accommodation station device in a communication system including an access point and a wireless terminal, the access point including the accommodation station device and an extension station device connected to each other through an optical fiber transmitting an optical signal, and the wireless terminal communicating with the extension station device by using a radio-wave signal, the accommodation station device including: a transmission unit that transmits, to the wireless terminal, a first radio-wave signal according to an optical signal with a first wavelength, and a second radio-wave signal according to an optical signal with a second wavelength; a communication start time information acquisition unit that acquires information on a first communication start time that is a time at which communication using the optical signal with the first wavelength is started in the accommodation station device, and information on a second communication start time that is a time at which communication using the optical signal with the second wavelength is started in the accommodation station device; a reception time information acquisition unit that acquires information on a first reception time that is a reception time related to the first radio-wave signal in the accommodation station device, and information on a second reception time that is a reception time related to the second radio-wave signal in the accommodation station device; a transmission time period derivation unit that derives a first round trip time that is a time period from the first communication start time until the first reception time, and derives a second round trip time that is a time period from the second communication start time until the second reception time; and an optical fiber length derivation unit that derives a length of the optical fiber, based on the first round trip time, the second round trip time, a group velocity or a group delay time of the optical signal with the first wavelength, and a group velocity or a group delay time of the optical signal with the second wavelength.

Effects of the Invention

According to the present invention, it is possible to estimate an optical fiber length between an accommodation station device and an extension station device, without the extension station device including a signal processing unit.

DESCRIPTION OF EMBODIMENTS

Embodiments of the present invention will be described in detail, with reference to drawings.

Figure 1:
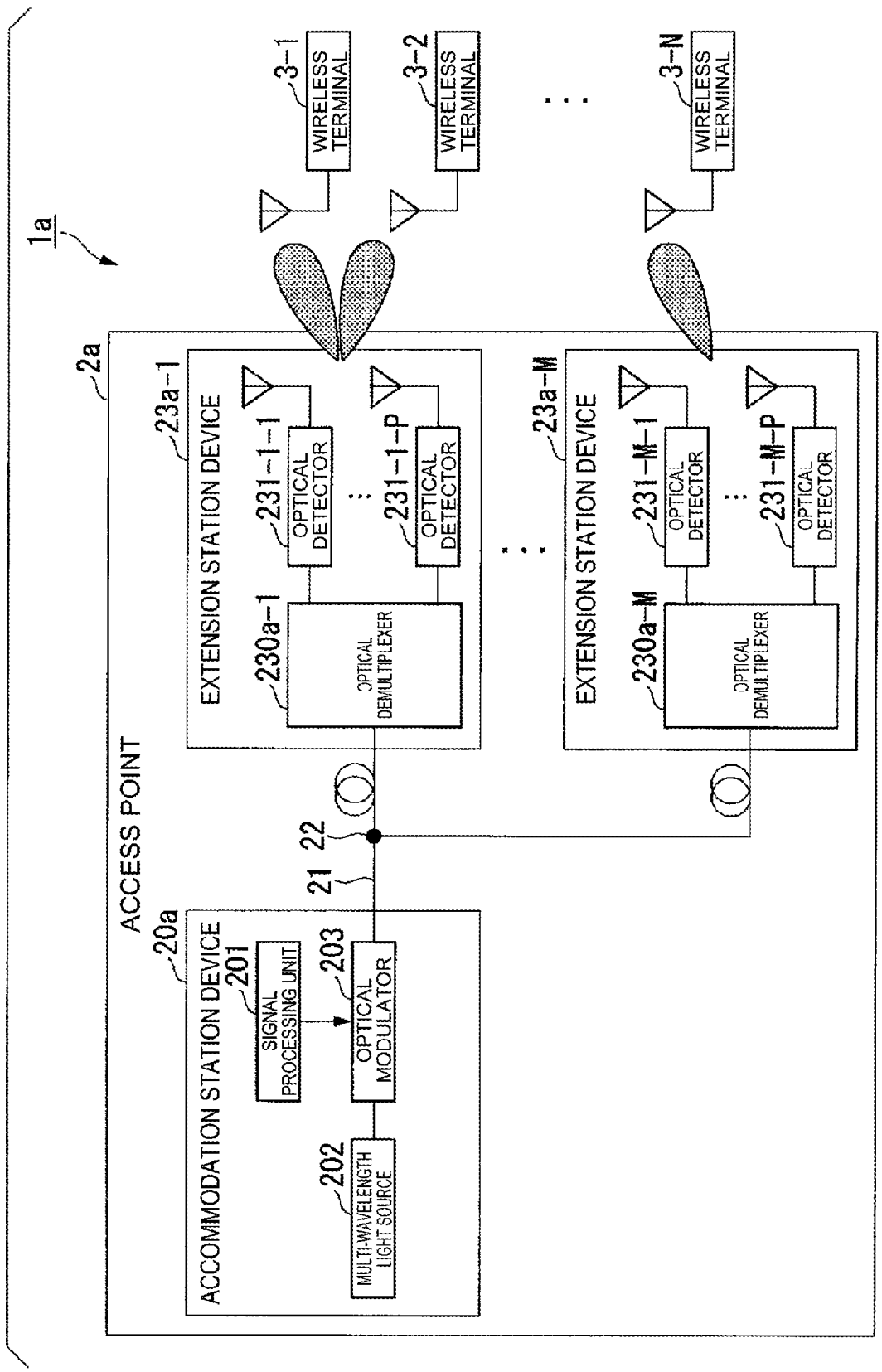
FIG. 1 shows an example of a configuration of a communication system in a first embodiment.

FIG. 1 shows an example of a configuration of a communication system 1a. The communication system 1a is a radio-over-fiber (ROF) system with a configuration of a passive optical network (PON). The communication system 1a includes an access point 2a and wireless terminals 3-1 to 3-N (N is an integer equal to or larger than one).

The access point 2a includes an accommodation station device 20a, an optical fiber 21, an optical splitter 22, and extension station devices 23a-1 to 23a-M (M is an integer equal to or larger than two). The extension station devices 23a are placed in such a manner that the extension station devices 23a extend outward from the accommodation station device 20a. The accommodation station device 20a and the extension station devices 23a are separated from each other by using a radio-over-fiber technology.

The accommodation station device 20a includes a signal processing unit 201, a multi-wavelength light source 202, and an optical modulator 203. Each extension station device 23a-m (m is any one of integers from one to M) includes an optical demultiplexer 230a-m and optical detectors 231-m-1 to 231-m-P (P is an integer equal to or larger than two). Each optical detector 231 includes an antenna (transmission unit, or transmitter).

The access point 2a is a communication device that connects one or more wireless terminals 3 to a predetermined network through wireless communication. The accommodation station device 20a is a device that accommodates signals of a plurality of wireless terminals 3 through wireless communication. The optical fiber 21 transmits an optical signal between the accommodation station device 20a and each extension station device 23a. The optical splitter 22 splits a downlink (downstream) optical signal transmitted in the optical fiber 21. The optical splitter 22 multiplexes a plurality of uplink (upstream) optical signals transmitted in the optical fiber 21. The extension station devices 23a perform wireless communication with the wireless terminal 3. The wireless terminal 3 is a terminal that performs wireless communication.

For the communication system 1a to perform optical beamforming, it is not necessary to estimate an optical fiber length between every one of the extension station devices 23a and the accommodation station device 20a in the access point 2a. The accommodation station device 20a estimates an optical fiber length between the accommodation station device 20a and an extension station device 23a to which the wireless terminal 3 (station), with which the accommodation station device 20a is communicating, is connected through wireless communication. The communication system 1a performs optical beamforming, based on an estimated value of the optical fiber length of the optical fiber 21 in which an optical signal is transmitted when the accommodation station device 20a communicates with the wireless terminal 3-n.

Accordingly, using optical signals with mutually different wavelengths, the accommodation station device 20a derives, for each optical signal wavelength, a round-trip transmission time period "$\Delta t$" (RoF-RTT) of signals (optical signal, radio-wave signal) between the accommodation station device 20a and the wireless terminal 3, based on time information. Instead of the accommodation station device 20a deriving the round-trip transmission time period, the wireless terminal 3 may derive the round-trip transmission time period "$\Delta t$" for each optical signal wavelength. The accommodation station device 20a estimates the optical fiber length, based on a difference between a round-trip transmission time period "$\Delta t_1$" of communication using an optical signal with a first wavelength between the accommodation station device 20a and the wireless terminal 3 and a round-trip transmission time period "$\Delta t_2$" of communication using an optical signal with a second wavelength between the accommodation station device 20a and the wireless terminal 3.

Figure 2:
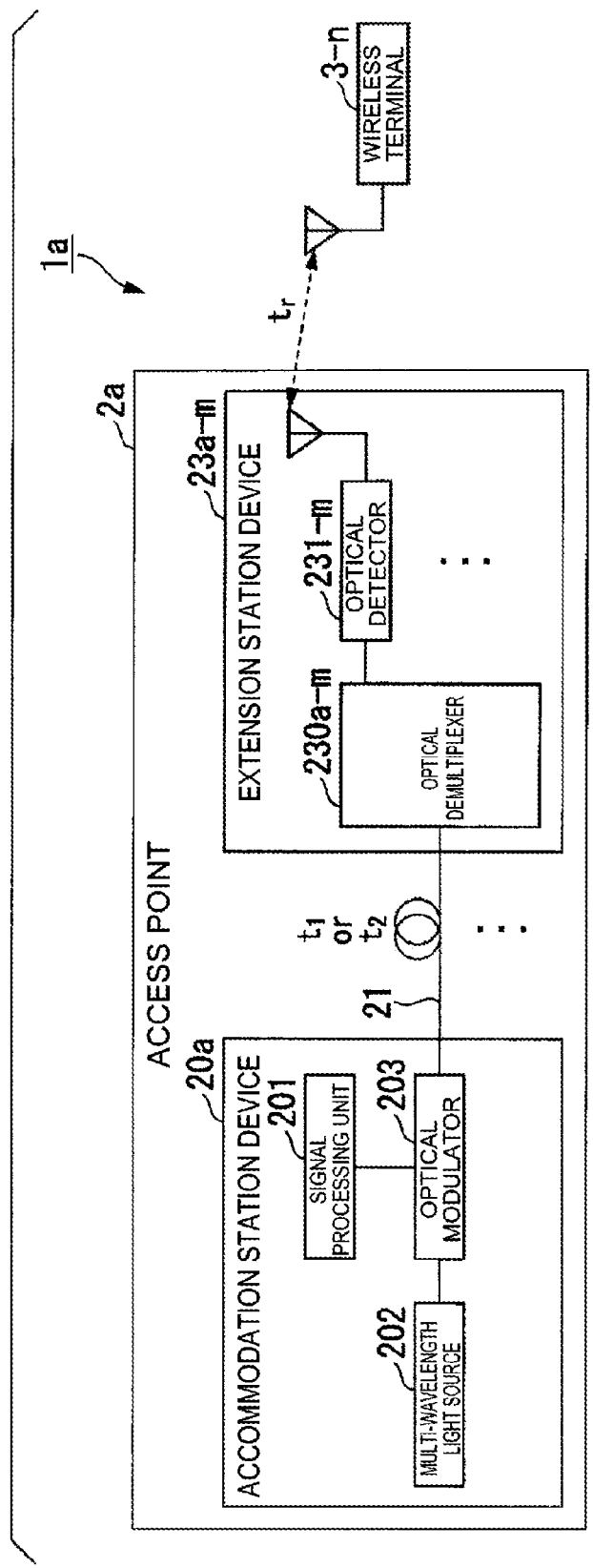
FIG. 2 shows an example of a configuration of part of the communication system in the first embodiment.

FIG. 2 shows an example of a configuration of part of the communication system 1a. A portion or all of the signal processing unit 201 are implemented as software in such a manner that a processor such as a CPU (Central Processing Unit) executes a program stored in a memory that is a non-volatile recording medium (non-transitory recording medium). A portion or all of the signal processing unit 201 may be implemented by using hardware such as an LSI (Large Scale Integrated circuit) or an FPGA (Field Programmable Gate Array).

Any extension station device 23a-m is communicationally connected to any wireless terminal 3-n with which the accommodation station device 20a is communicating. The accommodation station device 20a estimates the optical fiber length "l" between the accommodation station device 20a and the extension station device 23a-m, based on a round-trip transmission time period "$2t_1$" of an optical signal with a wavelength "$\lambda_1$" in an optical fiber segment, a round-trip transmission time period "$2t_2$" of an optical signal with a wavelength "$\lambda_2$" in the optical fiber segment, and a wait time period "$t_s$" of the wireless terminal 3. The wait time period "$t_s$" is a fixed value equal to or larger than zero.

When downlink communication using the optical signal with the wavelength "$\lambda_1$" is started, the accommodation station device 20a acquires time information as information on a communication start time "$t_{1\_tx}$". The optical signal with the wavelength "$\lambda_1$" transmitted through the optical fiber 21 is transmitted to one of the optical detectors 231-*m* via the optical demultiplexer 230*a*-*m* that is a variable optical demultiplexer. The optical detector 231-*m* transmits a radio-wave signal according to the optical signal with the wavelength "$\lambda_1$", at a predetermined frequency, from an antenna of the optical detector 231-*m*. An antenna of the wireless terminal 3-*n* receives the radio-wave signal transmitted from the antenna of the optical detector 231-*m* via the wireless segment. When the antenna of the wireless terminal 3-*n* is an array antenna, one antenna element included in the array antenna may receive the radio-wave signal based on the optical signal with the wavelength "$\lambda_1$". At a time when the wait time period "$t_s$" has passed since the radio-wave signal was received, the wireless terminal 3-*n* transmits a radio-wave signal in uplink communication from the antenna that has received the radio-wave signal in the downlink communication.

When downlink communication using the optical signal with the wavelength "$\lambda_2$" is started, the accommodation station device 20*a* acquires time information as information on a communication start time "$t_{2\_tx}$". The optical signal with the wavelength "$\lambda_2$" transmitted through the optical fiber 21 is transmitted to one of the optical detectors 231-*m* via the optical demultiplexer 230*a*-*m* that is a variable optical demultiplexer. The optical detector 231-*m* transmits a radio-wave signal according to the optical signal with the wavelength "$\lambda_2$", at a predetermined frequency, from an antenna of the optical detector 231-*m*. The antenna of the wireless terminal 3-*n* receives the radio-wave signal transmitted from the antenna of the optical detector 231-*m* via the wireless segment. When the antenna of the wireless terminal 3-*n* is an array antenna, one antenna element included in the array antenna may receive the radio-wave signal based on the optical signal with the wavelength "$\lambda_2$". At a time when the wait time period "$t_s$" has passed since the radio-wave signal was received, the wireless terminal 3-*n* transmits a radio-wave signal in uplink communication from the antenna that has received the radio-wave signal in the downlink communication.

The round-trip transmission time period "$\Delta t_1$" in the case where the communication using the optical signal with the wavelength "$\lambda_1$" is started is expressed by using the communication start time "$t_{1\_tx}$" and a reception time "$t_{1\_rx}$". In other words, the round-trip transmission time period "$\Delta t_1$" is expressed by using the round-trip transmission time period "$2t_1$" in the optical fiber segment, the wait time period "$t_s$", and a round-trip transmission time period "$2t_r$" of the radio-wave signals in the wireless segment.

The round-trip transmission time period "$\Delta t_2$" in the case where the communication using the optical signal with the wavelength "$\lambda_2$" is started is expressed by using the communication start time "$t_{2\_tx}$" and a reception time "$t_{2\_rx}$". In other words, the round-trip transmission time period "$\Delta t_2$" is expressed by using the round-trip transmission time period "$2t_2$" in the optical fiber segment, the wait time period "$t_s$", and the round-trip transmission time period "$2t_r$" of the radio-wave signals in the wireless segment. Accordingly, the round-trip transmission time period "$\Delta t_1$" and the round-trip transmission time period "$\Delta t_2$" are expressed as in Expression (1).

$$\begin{cases} \Delta t_1 = 2t_1 + 2t_r + t_s \\ \Delta t_2 = 2t_2 + 2t_r + t_s \end{cases} \quad (1)$$

In measurement of the round-trip transmission time period "$\Delta t_1$" and measurement of the round-trip transmission time period "$\Delta t_2$", the extension station device 23*a*-*m* uses the same antenna of the extension station device 23*a*-*m*. In the measurement of the round-trip transmission time period "$\Delta t_1$" and the measurement of the round-trip transmission time period "$\Delta t_2$", the wireless terminal 3-*n* uses the same antenna of the wireless terminal 3-*n*. In such cases, in the measurement of the round-trip transmission time period "$\Delta t_1$" and the measurement of the round-trip transmission time period "$\Delta t_2$", transmission distances of the radio-wave signals in the wireless segment are identical. In other words, the transmission time periods "$t_r$" of the radio-wave signals in the wireless segment between the optical detectors 231-*m* and the wireless terminal 3-*n* are constant in the measurement of the round-trip transmission time period "$\Delta t_1$" and the measurement of the round-trip transmission time period "$\Delta t_2$". The transmission time periods "$t_r$" of the radio-wave signals in the wireless segment are cancelled out, with a difference between the transmission time periods in the optical fiber segment remaining, and hence the difference between the round-trip transmission time period "$\Delta t_1$" and the round-trip transmission time period "$\Delta t_2$" is expressed as in Expression (2).

$$\Delta t_1 - \Delta t_2 = 2t_1 - 2t_2 \quad (2)$$

Here, "$2t_1$" represents the round-trip transmission time period of the optical signal with the wavelength "$\lambda_1$" in the optical fiber segment including the optical fiber 21. "$2t_2$" represents the round-trip transmission time period of the optical signal with the wavelength "$\lambda_2$" in the optical fiber segment including the optical fiber 21.

A transmission rate (group velocity) of an optical signal in the optical fiber segment is determined depending on a type (material or the like) of the optical fiber 21 and a wavelength of the optical signal. With respect to the round-trip time periods (round trip times) of the signals between the accommodation station device 20*a* and the wireless terminal 3, the difference between the round-trip transmission time period "$\Delta t_1$" and the round-trip transmission time period "$\Delta t_2$" is expressed as in Expression (3), based on Expression (2).

$$\Delta t_1 - \Delta t_2 = 2l/v_1 - 2l/v_2 \quad (3)$$

Here, "l" represents the optical fiber length. "$v_1$" represents a transmission rate (group velocity) of the optical signal with the wavelength "$\lambda_1$" in the optical fiber segment. "$v_2$" represents a transmission rate (group velocity) of the optical signal with the wavelength "$\lambda_2$" in the optical fiber segment. The optical fiber length "l" is expressed as in Expression (4).

$$l = \frac{v_2 v_1}{2(v_2 - v_1)}(\Delta t_1 - \Delta t_2). \quad (4)$$

The accommodation station device 20*a* derives the optical fiber length "l" as in Expression (4), based on the transmission rate "$v_1$" and the transmission rate "$v_2$" that are already known, and on the difference "$\Delta t_1 - \Delta t_2$" between the round-trip transmission time periods that are based on the acquired time information.

Next, details of the accommodation station device 20*a* and the wireless terminal 3 will be described.

Figure 3:
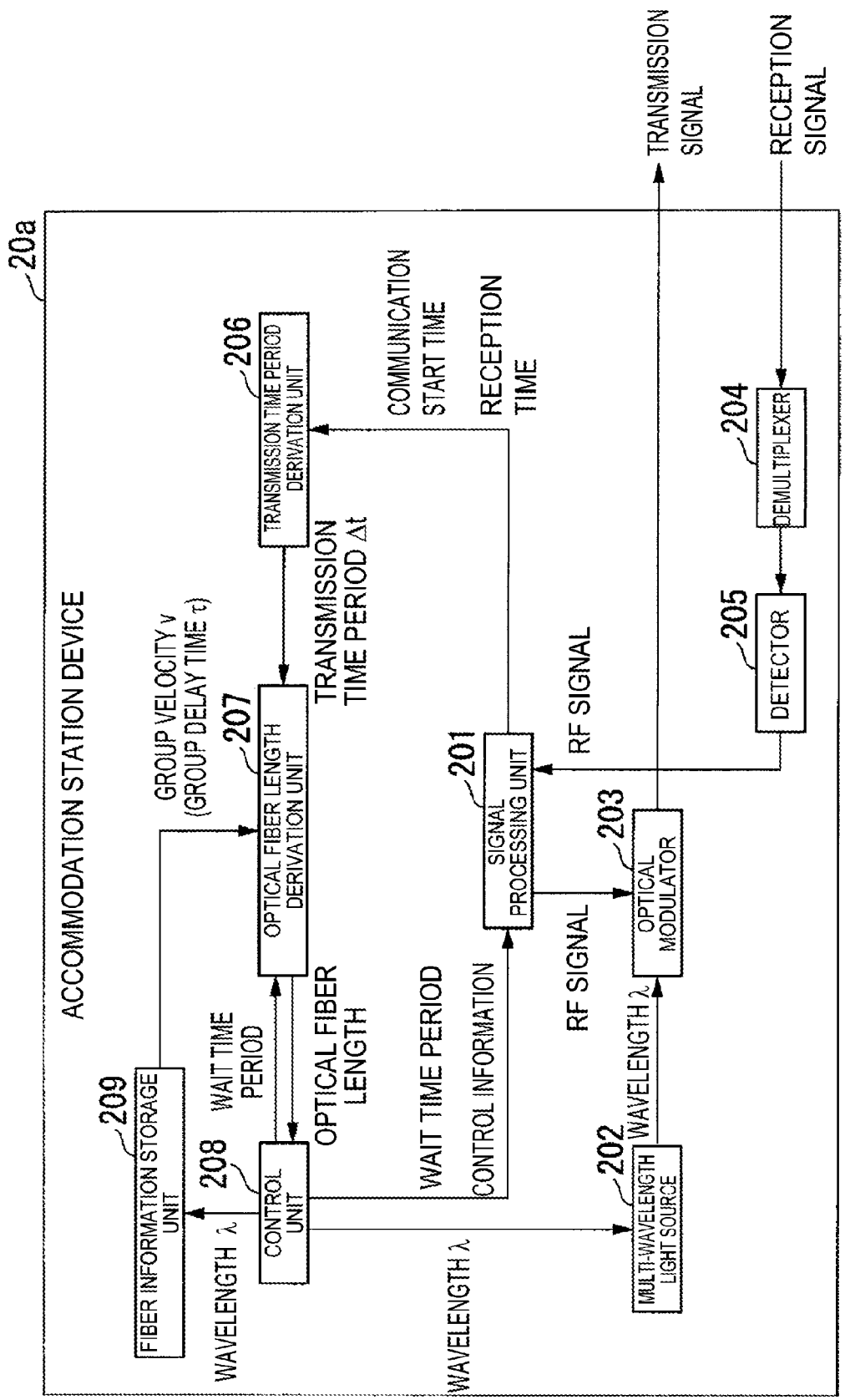
FIG. 3 shows an example of a configuration of an accommodation station device in the first embodiment.

FIG. 3 shows an example of a configuration of the accommodation station device 20*a*. The accommodation station device 20*a* includes the signal processing unit 201, the multi-wavelength light source 202, the optical modulator 203, a demultiplexer 204, a detector 205, a transmission time period derivation unit 206, an optical fiber length derivation unit 207, a control unit 208, and a fiber information storage unit 209.

The signal processing unit 201 acquires time information. When downlink communication is started, the signal processing unit 201 outputs information on a communication start time to the transmission time period derivation unit 206. The signal processing unit 201 acquires, from the control unit 208, control information for optical beamforming based on an estimated optical fiber length, and information on the wait time period "$t_s$". The control information is, for example, weighting information for a phase of a radio signal to be transmitted from each antenna element. In uplink communication, when an electrical signal (hereinafter, referred to as "RF (Radio Frequency) signal") associated with a radio-wave signal is received, the signal processing unit 201 outputs information on a communication start time and information on a reception time to the transmission time period derivation unit 206. The RF signal includes information on the wait time period of the wireless terminal 3. The multi-wavelength light source 202 outputs light with a wavelength "λ" specified by the control unit 208 to the optical modulator 203.

The optical modulator 203 receives the light with the wavelength "λ" from the multi-wavelength light source 202. The optical modulator 203 acquires a downlink RF signal from the signal processing unit 201. The optical modulator 203 performs modulation processing according to the downlink RF signal on each of streams of light with mutually different wavelengths. The optical modulator 203 transmits, as a transmission signal, downlink optical signals that are results of the modulation processing to the extension station device 23a-m.

The demultiplexer 204 receives, as a reception signal, a plurality of uplink optical signals from the extension station device 23a-m. The demultiplexer 204 demultiplexes the plurality of uplink optical signals. The demultiplexer 204 outputs each of the demultiplexed optical signals to the detector 205. The detector 205 performs predetermined wave detection processing on each optical signal. The detector 205 outputs uplink RF signals that are results of the wave detection processing to the signal processing unit 201.

When the accommodation station device 20a starts downlink communication using an optical signal, the transmission time period derivation unit 206 acquires information on a communication start time from the signal processing unit 201. When the accommodation station device 20a receives an uplink optical signal, the transmission time period derivation unit 206 acquires information on a reception time from the signal processing unit 201. The transmission time period derivation unit 206 derives a difference between the round-trip transmission time periods of each optical signal, as in Expression (2).

The optical fiber length derivation unit 207 acquires information on group velocities from the fiber information storage unit 209. The optical fiber length derivation unit 207 derives an optical fiber length as in Expressions (3) and (4), based on the derived transmission time periods and the group velocities.

The control unit 208 specifies, to the multi-wavelength light source 202, a wavelength "λ" of an optical signal used in optical beamforming, based on the derived optical fiber length and control information for the optical beamforming. The fiber information storage unit 209 stores a data table beforehand in which information on wavelengths "λ" and group velocities are associated with each other. The fiber information storage unit 209 outputs, to the optical fiber length derivation unit 207, information on a group velocity associated with the wavelength "λ" specified by the control unit 208 to the multi-wavelength light source 202.

Figure 4:
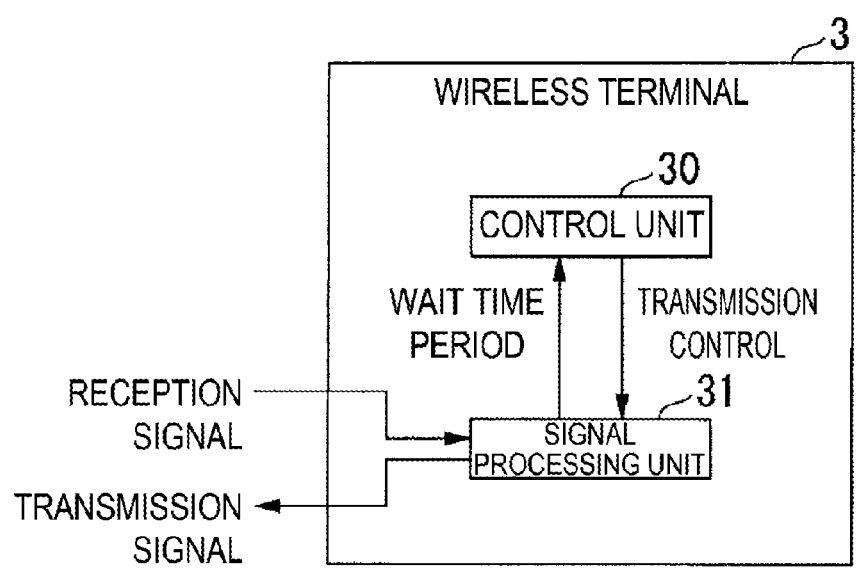
FIG. 4 shows an example of a configuration of a wireless terminal in the first embodiment.

FIG. 4 shows an example of a configuration of the wireless terminal 3. The wireless terminal 3 includes a control unit 30 and a signal processing unit 31. A portion or all of the control unit 30 and the signal processing unit 31 are implemented as software in such a manner that a processor such as a CPU executes a program stored in a memory that is a non-volatile recording medium (non-transitory recording medium). A portion or all of the control unit 30 and the signal processing unit 31 may be implemented by using hardware such as an LSI or an FPGA.

The control unit 30 acquires information on the wait time period from the signal processing unit 31. When the information on the wait time period is acquired, the control unit 30 acquires current time information as information on a reception time. When the wait time period has passed since the reception time, the control unit 30 outputs a transmission control signal to the signal processing unit 31.

When a radio-wave signal (reception signal) based on a downlink optical signal is received, the signal processing unit 31 acquires the information on the wait time period from the radio-wave signal. The signal processing unit 31 outputs the information on the wait time period to the control unit 30. When the transmission control signal is acquired from the control unit 30, the signal processing unit 31 transmits a radio-wave signal (transmission signal) associated with an uplink optical signal to the accommodation station device 20a.

Next, an example of operation in the communication system 1a will be described.

Figure 5:
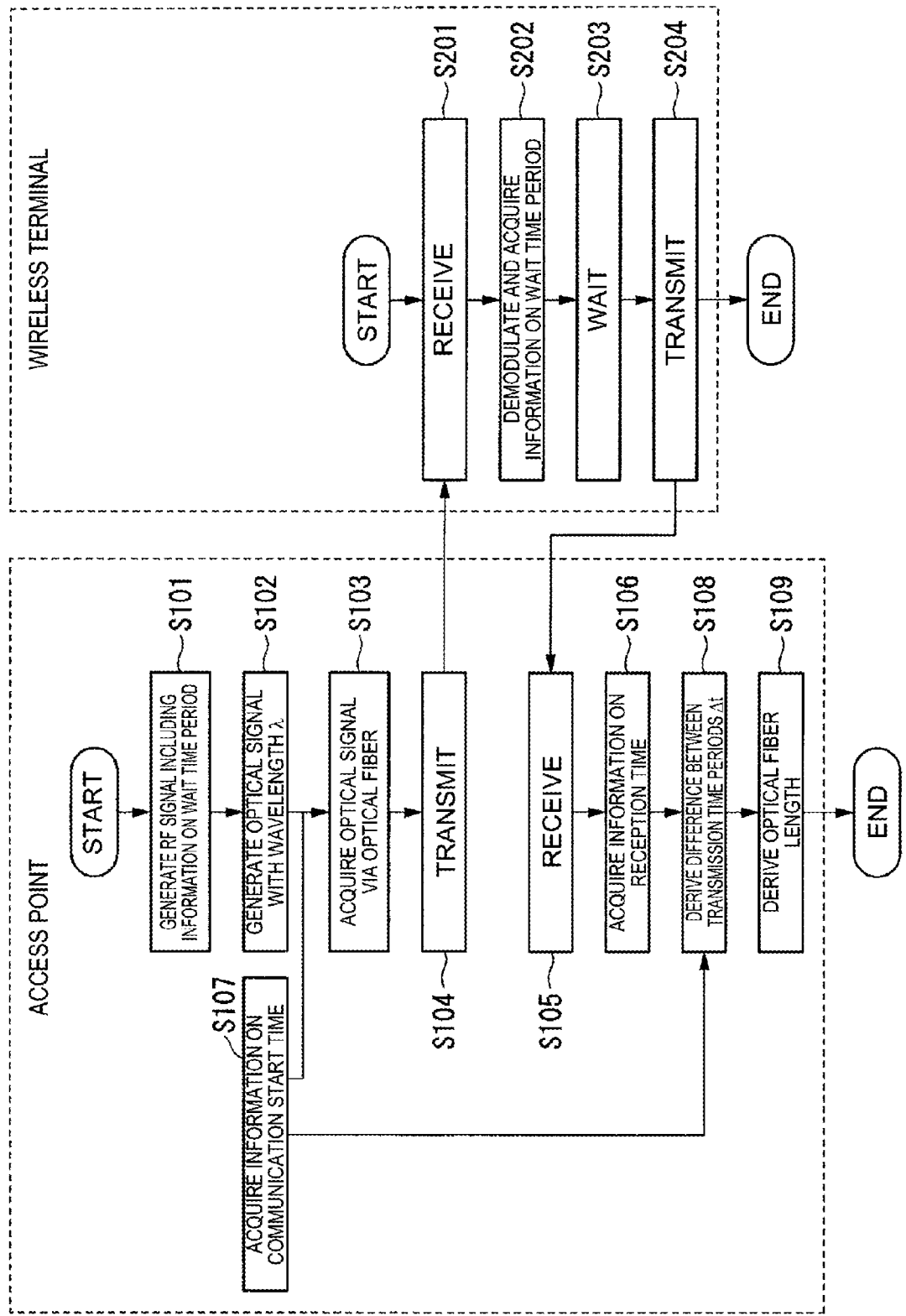
FIG. 5 is a sequence chart showing an example of operation in the communication system in the first embodiment.

FIG. 5 is a sequence chart showing an example of the operation in the communication system 1a. The signal processing unit 201 generates RF signals including information on a wait time period (step S101). The optical modulator 203 generates optical signals with wavelengths "λ" (step S102). The optical demultiplexer 230a acquires the optical signals via the optical fiber 21 (step S103). Corresponding ones of the optical detectors 231 transmit downlink radio-wave signals by using the respective antennas (step S104).

The optical detectors 231 receive uplink radio-wave signals by using the antennas that have transmitted the downlink radio-wave signals (step S105). When the signal processing unit 201 acquires uplink RF signals, the transmission time period derivation unit 206 acquires information on reception times at the signal processing unit 201 (step S106). The transmission time period derivation unit 206 acquires information on communication start times (step S107).

The transmission time period derivation unit 206 derives round-trip transmission time periods "Δt" (round trip times), based on the communication start times and the reception times. The transmission time period derivation unit 206 derives a difference "$\Delta t_1 - \Delta t_2$" between the round-trip transmission time periods of the signals (step S108). The optical fiber length derivation unit 207 derives an optical fiber length between an extension station device 23a including the antennas that have transmitted the downlink radio-wave signals and the accommodation station device 20a, based on the difference between the round-trip transmission time periods "Δt" of the signals (step S109).

The signal processing unit 31 receives the radio-wave signals (reception signal) based on the downlink optical signals (step S201). The signal processing unit 31 performs demodulation processing on the received radio-wave signals. The signal processing unit 31 acquires the information on the wait time period from the radio-wave signals (step S202). The signal processing unit 31 waits to transmit the radio-wave signals associated with uplink optical signals until the transmission control signal is received from the control unit 30 (step S203). When a transmission control signal is received from the control unit 30, the signal processing unit 31 transmits the radio-wave signals associated with the uplink optical signals (step S204).

As described above, the communication system 1*a* in the first embodiment includes the access point 2*a* and the one or more wireless terminals 3. The access point 2*a* includes the accommodation station device 20*a* and the extension station devices 23*a* connected to each other through the optical fiber 21 transmitting optical signals. The wireless terminal 3 communicates with the extension station devices 23*a* by using a radio-wave signal. The accommodation station device 20*a* includes the transmission time period derivation unit (transmission time period derivator) 206 (communication start time information acquisition unit, or communication start time information acquisitor, reception time information acquisition unit, or reception time information acquisitor), and the optical fiber length derivation unit (optical fiber length derivator) 207. The antenna of any extension station device 23*a* transmits, to the wireless terminal 3, the first radio-wave signal according to the optical signal with the first wavelength "$\lambda_1$" and the second radio-wave signal according to the optical signal with the second wavelength "$\lambda_2$". The transmission time period derivation unit 206 acquires information on the first communication start time that is a time at which communication using the optical signal with the first wavelength is started in the accommodation station device 20*a*, and information on the second communication start time that is a time at which communication using the optical signal with the second wavelength is started in the accommodation station device 20*a*. The transmission time period derivation unit 206 acquires information on the first reception time that is a reception time related to the first radio-wave signal in the accommodation station device 20*a*, and information on the second reception time that is a reception time related to the second radio-wave signal in the accommodation station device 20*a*. The transmission time period derivation unit 206 derives the first round trip time "$\Delta t_1$" that is a time period from the first communication start time "$t_{1\_tx}$" until the first reception time "$t_{1\_rx}$". The transmission time period derivation unit 206 derives the second round trip time "$\Delta t_2$" that is a time period from the second communication start time "$t_{2\_tx}$" until the second reception time "$t_{2\_rx}$". The optical fiber length derivation unit 207 derives the optical fiber length "l", based on the first round trip time "$\Delta t_1$", the second round trip time "$\Delta t_2$", the group velocity "$v_1$" of the optical signal with the first wavelength, and the group velocity "$v_2$" of the optical signal with the second wavelength.

Thus, it is possible to estimate the optical fiber length "l" between the accommodation station device 20*a* and any extension station device 23*a*, without the extension station device 23*a* including the signal processing unit 201.

The optical fiber length derivation unit 207 derives the optical fiber length "l" as in Expression (4), based on the difference "$\Delta t_2 - \Delta t_2$" between the first round trip time and the second round trip time, the group velocity "$v_1$" of the optical signal with the first wavelength, and the group velocity "$v_2$" of the optical signal with the second wavelength.

Second Embodiment

A second embodiment is different from the first embodiment in a point that optical signals with wavelengths that are mutually different between an uplink and a downlink and radio-wave signals with frequencies that are mutually different between the uplink and the downlink are used. In the second embodiment, the point different from the first embodiment will be described.

In the first embodiment, the accommodation station device 20*a* or the wireless terminal 3 derives transmission time periods of optical signals with mutually different wavelengths in a downlink between the accommodation station device 20*a* and the wireless terminal 3. In the second embodiment, the accommodation station device 20*a* derives a difference between round-trip transmission time periods of optical signals, by using optical signals with wavelengths that are mutually different between an uplink and a downlink between the accommodation station device 20*a* and the wireless terminal 3. The accommodation station device 20*a* or the wireless terminal 3 estimates an optical fiber length, based on the derived difference between the transmission time periods.

In downlink communication, the wireless terminal 3 receives a radio-wave signal with a frequency "$f_{DL}$". In uplink communication, when the wait time period has passed since the reception time, the wireless terminal 3 transmits a radio-wave signal with a frequency "$f_{UL}$". The frequency "$f_{UL}$" of the uplink radio-wave signal and the frequency "$f_{DL}$" of the downlink radio-wave signal may be different from each other. Even when the uplink and downlink radio-wave signals have the different frequencies, transmission time periods "$t_r$" in the wireless segment are constant. Accordingly, as in the first embodiment, the optical fiber length can be estimated based on communication start times and reception times.

Figure 6:
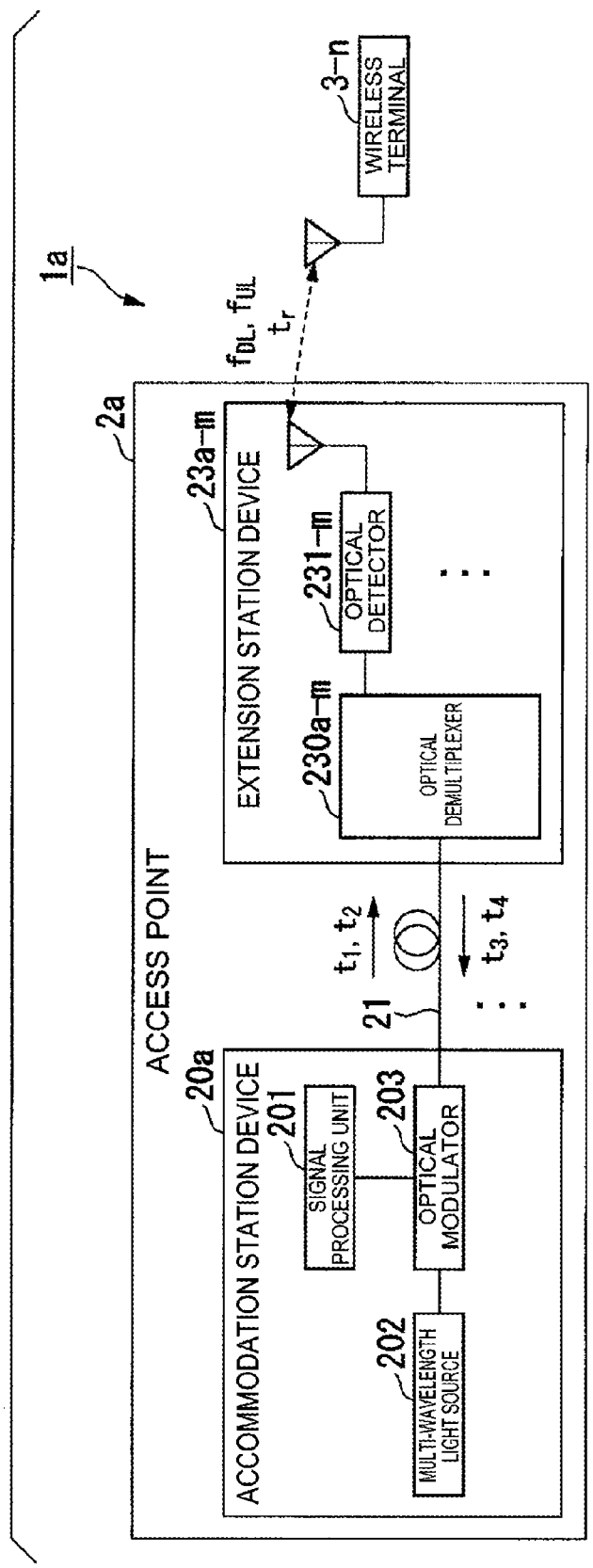
FIG. 6 shows an example of a configuration of part of the communication system in the second embodiment.

FIG. 6 shows an example of a configuration of part of the communication system 1*a*. Any extension station device 23*a-m* is communicationally connected to any wireless terminal 3-*n* with which the accommodation station device 20*a* is communicating. The accommodation station device 20*a* estimates the optical fiber length "l" between the accommodation station device 20*a* and the extension station device 23*a-m*, based on a downlink transmission time period "$t_1$" of an optical signal with a wavelength "$\lambda_1$" in the optical fiber segment, a downlink transmission time period "$t_2$" of an optical signal with a wavelength "$\lambda_2$" in the optical fiber segment, an uplink transmission time period "$t_3$" of an optical signal with a wavelength "$\lambda_3$" in the optical fiber segment, an uplink transmission time period "$t_4$" of an optical signal with a wavelength "$\lambda_4$" in the optical fiber segment, a round-trip transmission time period "$2t_r$" of the radio-wave signals in the wireless segment, and a wait time period "$t_s$" of the wireless terminal 3. The wait time period "$t_s$" is a fixed value. A round-trip transmission time period "$\Delta t_1$" and a round-trip transmission time period "$\Delta t_2$" are expressed as in Expression (5).

$$\begin{cases} \Delta t_1 = t_1 + t_3 + 2t_r + t_s \\ \Delta t_2 = t_2 + t_4 + 2t_r + t_s \end{cases} \quad (5)$$

A difference between the round-trip transmission time period "$\Delta t_1$" and the round-trip transmission time period "$\Delta t_2$" is expressed as in Expression (6).

$$\Delta t_1 - \Delta t_2 = (t_1 + t_3) - (t_2 + t_4) \quad (6)$$

The difference between the round-trip transmission time period "$\Delta t_1$" and the round-trip transmission time period "$\Delta t_2$" is expressed as in Expression (7), based on Expression (6).

$$\Delta t_1 - \Delta t_2 = (l/v_1 + l/v_3) - (l/v_2 + l/v_4) \quad (7)$$

Here, "l" represents the optical fiber length. "$v_1$" represents a transmission rate (group velocity) of the optical signal with the wavelength "$\lambda_1$" in the optical fiber segment. "$v_2$" represents a transmission rate (group velocity) of the optical signal with the wavelength "$\lambda_2$" in the optical fiber segment. "$v_3$" represents a transmission rate (group velocity) of the optical signal with the wavelength "$\lambda_3$" in the optical fiber segment. "$v_4$" represents a transmission rate (group velocity) of the optical signal with the wavelength "$\lambda_4$" in the optical fiber segment. The optical fiber length "l" is expressed as in Expression (8).

$$l = \frac{v_1 v_2 v_3 v_4}{v_2 v_3 v_4 + v_1 v_2 v_4 - v_1 v_3 v_4 - v_1 v_2 v_3}(\Delta t_1 - \Delta t_2) \quad (8)$$

The accommodation station device 20a derives the optical fiber length "l" as in Expression (8), based on the transmission rate "$v_1$", the transmission rate "$v_2$", the transmission rate "$v_3$", and the transmission rate "$v_4$" that are already known, and on the difference "$\Delta t_1 - \Delta t_2$" between the round-trip transmission time periods that are based on acquired time information.

As described above, the optical fiber length derivation unit 207 in the second embodiment derives the optical fiber length "l" as in Expression (8), based on the difference between the first round trip time "$\Delta t_1$" and the second round trip time "$\Delta t_2$", the group velocity "$v_1$" of the optical signal with the first wavelength, the group velocity "$v_2$" of the optical signal with the second wavelength, the group velocity "$v_3$" of the optical signal with the third wavelength, and the group velocity "$v_4$" of the optical signal with the fourth wavelength.

Thus, it is possible to estimate the optical fiber length "l" between the accommodation station device 20a and any extension station device 23a, by using optical signals with wavelengths that are mutually different between an uplink and a downlink, without the extension station device 23a including the signal processing unit 201.

Third Embodiment

A third embodiment is different from the first embodiment in a point that a group delay time is used instead of a group velocity, in estimation of an optical fiber length. In the third embodiment, the point different from the first embodiment will be described.

In estimation of the optical fiber length "l", a group delay time may be used instead of a group velocity. A group delay time is a transmission time period per unit length, and is represented by a reciprocal of a group velocity. A group delay time of an optical signal in the optical fiber segment is determined depending on a type of the optical fiber 21 and a wavelength of the optical signal. Expression (7) is expressed as in Expression (9).

$$\Delta t_1 - \Delta t_2 = 2l \times \tau_1 - 2l \times \tau_2 \quad (9)$$

Here, "$\tau_1$" represents a group delay time of the optical signal with the wavelength "$\lambda_1$" in the optical fiber segment. "$\tau_2$" represents a group delay time of the optical signal with the wavelength "$\lambda_2$" in the optical fiber segment. The optical fiber length "l" is expressed as in Expression (10).

$$l = \frac{\Delta t_1 - \Delta t_2}{2(\tau_1 - \tau_2)} \quad (10)$$

The fiber information storage unit 209 stores information on the group delay times. The accommodation station device 20a derives the optical fiber length "l" as in Expression (10), based on the group delay time "$\tau_1$" and the group delay time "$\tau_2$" that are already known, and on the round-trip transmission time period "$\Delta t_1$" and the round-trip transmission time period "$\Delta t_2$" that are based on acquired time information.

In such manners, the transmission time period derivation unit 206 derives transmission time periods of the optical signals as in Expressions (1) and (2), based on communication start times and reception times. The optical fiber length derivation unit 207 acquires the information on the group delay times from the fiber information storage unit 209. The optical fiber length derivation unit 207 derives the optical fiber length as in Expressions (9) and (10), based on the derived transmission time periods and the group delay times.

As described above, the optical fiber length derivation unit 207 in the third embodiment derives the optical fiber length "l" as in Expression (10), based on the first round trip time "$\Delta t_1$", the second round trip time "$\Delta t_2$", the group delay time "$\tau_1$" of the optical signal with the first wavelength, and the group delay time "$\tau_2$" of the optical signal with the second wavelength.

Thus, it is possible to estimate the optical fiber length "l" between the accommodation station device 20a and any extension station device 23a, based on group delay times, without the extension station device 23a including the signal processing unit 201.

The optical fiber length derivation unit 207 derives the optical fiber length "l" as in Expression (10), based on the difference "$\Delta t_1 - \Delta t_2$" between the first round trip time and the second round trip time, the group delay time "$\tau_1$" of the optical signal with the first wavelength, and the group delay time "$\tau_2$" of the optical signal with the second wavelength.

Fourth Embodiment

A fourth embodiment is different from the third embodiment in a point that optical signals with wavelengths that are mutually different between an uplink and a downlink and radio-wave signals with frequencies that are mutually different between the uplink and the downlink are used. In the fourth embodiment, the point different from the third embodiment will be described.

In the third embodiment, the accommodation station device 20a or the wireless terminal 3 derives round-trip transmission time periods of optical signals with wavelengths that are identical in an uplink and a downlink between the accommodation station device 20a and the wireless terminal 3. In the fourth embodiment, the accommodation station device 20a or the wireless terminal 3 derives round-trip transmission time periods of optical signals with wavelengths that are mutually different between an uplink and a downlink between the accommodation station device 20a and the wireless terminal 3. The accommodation station device 20a or the wireless terminal 3 estimates an optical fiber length, based on a difference between the derived round-trip transmission time periods.

Any extension station device 23a-m is communicationally connected to any wireless terminal 3-n with which the accommodation station device 20a is communicating. The accommodation station device 20a estimates the optical fiber length "l" between the accommodation station device 20a and the extension station device 23a-m, based on a downlink transmission time period "$t_2$" of an optical signal with a wavelength "$\lambda_1$" in the optical fiber segment, a downlink transmission time period "$t_2$" of an optical signal with a wavelength "$\lambda_2$" in the optical fiber segment, an uplink transmission time period "$t_3$" of an optical signal with a wavelength "$\lambda_3$" in the optical fiber segment, an uplink transmission time period "$t_4$" of an optical signal with a wavelength "$\lambda_4$" in the optical fiber segment, a round-trip transmission time period "$2t_r$" of radio-wave signals in the wireless segment, and a wait time period "$t_s$" of the wireless terminal 3. The wait time period "$t_s$" is a fixed value.

When downlink communication using the optical signal with the wavelength "$\lambda_1$" is started, the accommodation station device 20a acquires time information as information on a communication start time "$t_{1\_tx}$". The optical signal with the wavelength "$\lambda_1$" transmitted through the optical fiber 21 is transmitted to one of the optical detectors 231-m via the optical demultiplexer 230a-m that is a variable optical demultiplexer. The optical detector 231-m transmits a radio-wave signal according to the optical signal with the wavelength "$\lambda_1$", at a predetermined frequency, from an antenna of the optical detector 231-m. An antenna of the wireless terminal 3-n receives the radio-wave signal with the frequency "$f_{DL}$" transmitted from the antenna of the optical detector 231-m via the wireless segment. When the antenna of the wireless terminal 3-n is an array antenna, one antenna element included in the array antenna may receive the radio-wave signal based on the optical signal with the wavelength "$\lambda_1$". At a time when the wait time period "$t_s$" has passed since the radio-wave signal was received, the wireless terminal 3-n transmits a radio-wave signal with a frequency "$f_{UL}$" in uplink communication from the antenna that has received the radio-wave signal in the downlink communication. The extension station device 23a receives the radio-wave signal with the frequency "$f_{UL}$" in the uplink communication at an antenna of one of the optical detectors 231-m. The accommodation station device 20a acquires the optical signal with the wavelength "$\lambda_3$" from the optical detector 231-m.

The accommodation station device 20a operates similarly in communication using the optical signal with the wavelength "$\lambda_2$" and the optical signal with the wavelength "$\lambda_4$", as in the communication using the optical signal with the wavelength "$\lambda_1$" and the optical signal with the wavelength "$\lambda_3$".

A group delay time of an optical signal in the optical fiber segment is determined depending on a type of the optical fiber 21 and a wavelength of the optical signal. Expression (7) is expressed as in Expression (11).

$$\Delta t_1 - \Delta t_2 = (l \times \tau_1 + l \times \tau_3) - (l \times \tau_2 + l \times \tau_4) \quad (11)$$

Here, "l" represents the optical fiber length. "$\tau_1$" represents a group delay time of the downlink optical signal with the wavelength "$\lambda_1$" in the optical fiber segment. "$\tau_2$" represents a group delay time of the downlink optical signal with the wavelength "$\lambda_2$" in the optical fiber segment. "$\tau_3$" represents a group delay time of the uplink optical signal with the wavelength "$\lambda_3$" in the optical fiber segment. "$\tau_4$" represents a group delay time of the uplink optical signal with the wavelength "$\lambda_4$" in the optical fiber segment. The optical fiber length "l" is expressed as in Expression (12).

$$l = \frac{\Delta t_1 - \Delta t_2}{(\tau_1 + \tau_3) - (\tau_2 + \tau_4)} \quad (12)$$

The accommodation station device 20a derives the optical fiber length "l" as in Expression (12), based on the group delay time "$\tau_1$", the group delay time "$\tau_2$", the group delay time "$\tau_3$", the group delay time "$\tau_4$", and the difference "$\Delta t_1 - \Delta t_2$" between the round-trip transmission time periods that are based on acquired time information.

As described above, the optical fiber length derivation unit 207 in the fourth embodiment derives the optical fiber length "l" as in Expression (12), based on the difference between the first round trip time "$\Delta t_1$" and the second round trip time "$\Delta t_2$", the group delay time "$\tau_1$" of the optical signal with the first wavelength, the group delay time "$\tau_2$" of the optical signal with the second wavelength, the group delay time "$\tau_3$" of the optical signal with the third wavelength, and the group delay time "$\tau_4$" of the optical signal with the fourth wavelength.

Thus, it is possible to estimate the optical fiber length "l" between the accommodation station device 20a and any extension station device 23a, by using optical signals with wavelengths that are mutually different between an uplink and a downlink and radio-wave signals with frequencies that are mutually different between the uplink and the downlink, without the extension station device 23a including the signal processing unit 201.

Fifth Embodiment

A fifth embodiment is different from the first embodiment in a point that an accommodation station device includes a plurality of light sources with fixed wavelengths, instead of the multi-wavelength light source. In the fifth embodiment, the point different from the first embodiment will be described.

Figure 7:
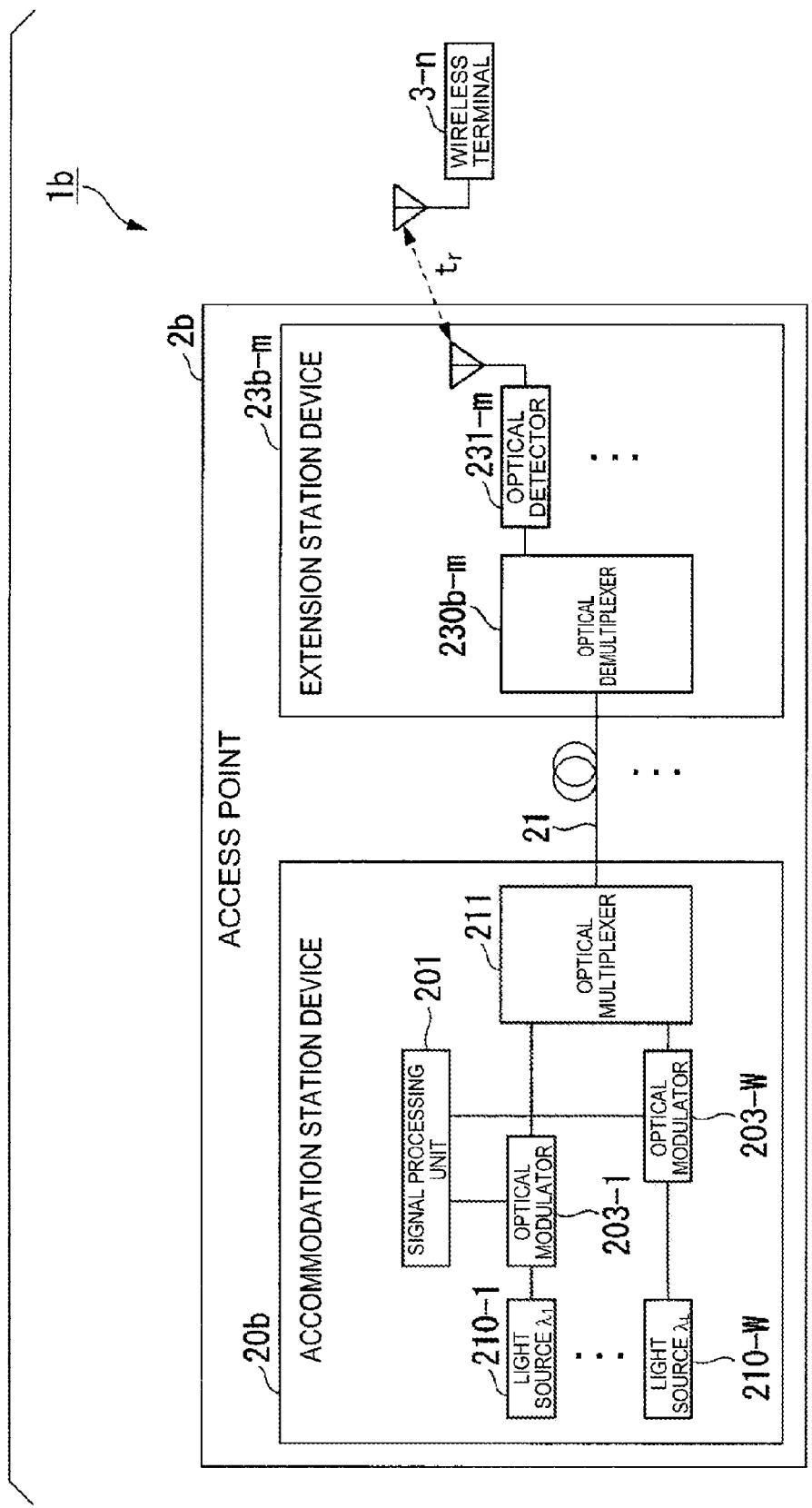
FIG. 7 shows an example of a configuration of part of a communication system in a fifth embodiment.

FIG. 7 shows an example of a configuration of a communication system 1b. The communication system 1b is a radio-over-fiber (ROF) system with a configuration of a passive optical network (PON). The communication system 1b includes an access point 2b and wireless terminals 3-1 to 3-N. The access point 2b is a communication device that connects one or more wireless terminals 3 to a predetermined network through wireless communication.

The access point 2b includes an accommodation station device 20b, an optical fiber 21, an optical splitter 22, and extension station devices 23b-1 to 23b-M. The accommodation station device 20b includes a signal processing unit 201, optical modulators 203-1 to 203-W (W is an integer equal to or larger than two), light sources 210-1 to 210-W, and an optical multiplexer 211.

Each light source 210-w (w is any one of integers from 2 to W) is a light source with a fixed wavelength. The light source 210-w is connected to an optical modulator 203-w. The light source 210-w generates an optical signal, according to a signal outputted from the signal processing unit 201.

The optical multiplexer 211 multiplexes respective optical signals generated by the light sources 210-1 to 210-W. The optical multiplexer 211 transmits the optical signal with the wavelength "$\lambda_1$" to any extension station device 23a-m, according to a result of the multiplexing of the optical signals. The optical multiplexer 211 transmits the optical signal with the wavelength "$\lambda_2$" to the extension station device 23a-m, according to the result of the multiplexing.

As described above, the accommodation station device 20b in the fifth embodiment includes the light sources 210-1 to 210-W. The plurality of light sources 210 output streams of light with the fixed wavelengths ranging from the wavelength "$\lambda_1$" to a wavelength "$\lambda_L$" to the plurality of optical modulators 203 associated with the light sources 210, respectively. Thus, it is possible to estimate the optical fiber length "l" between the accommodation station device 20b and any extension station device 23b, without the extension station device 23b including the signal processing unit 201.

Sixth Embodiment

A sixth embodiment is different from the fifth embodiment in a point that each extension station device includes an optical demultiplexer for fixed wavelengths, instead of the variable optical demultiplexer. In the sixth embodiment, the point different from the fifth embodiment will be described.

Figure 8:
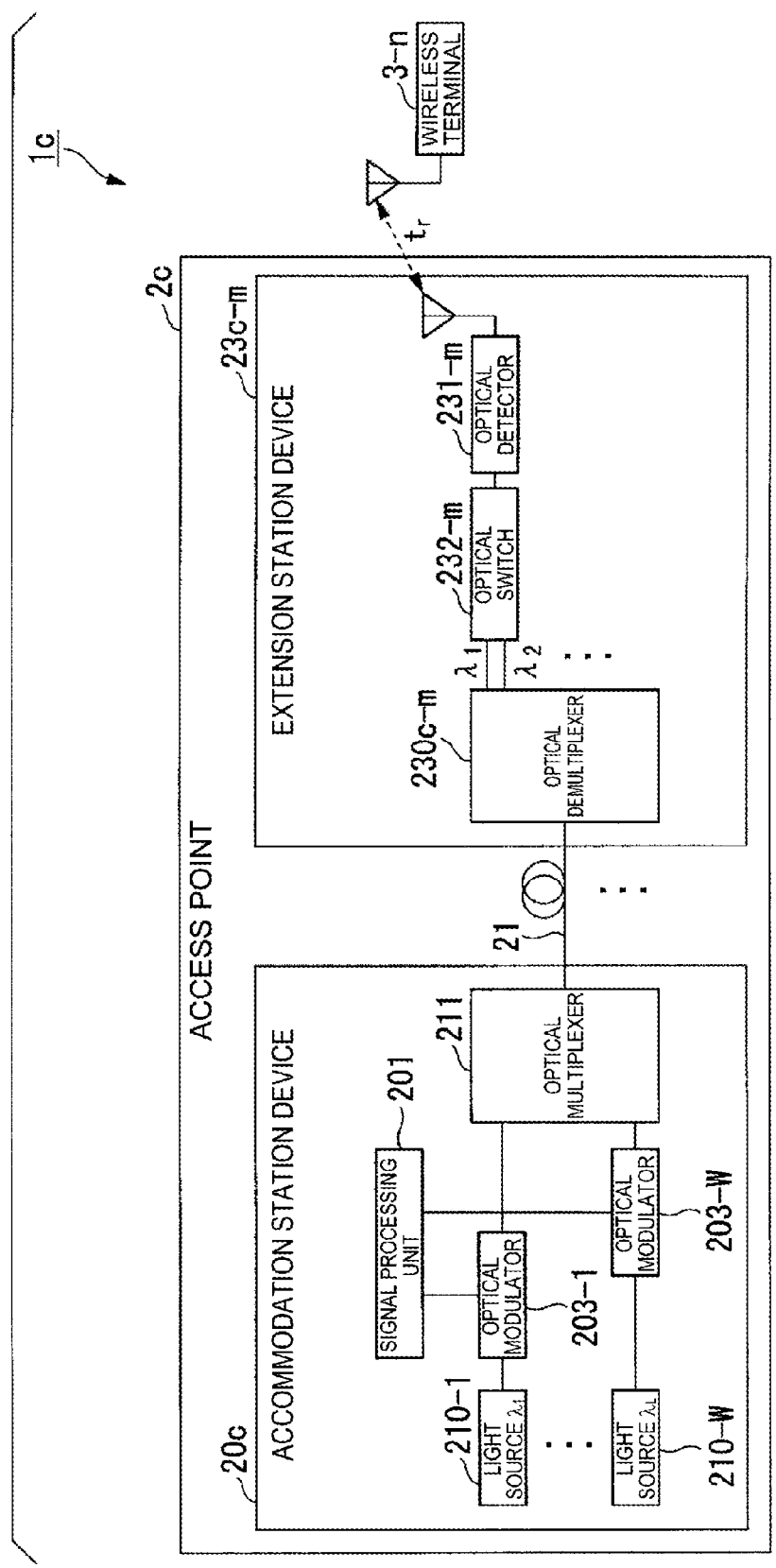
FIG. 8 shows an example of a configuration of part of a communication system in a sixth embodiment.

FIG. 8 shows an example of a configuration of a communication system 1c. The communication system 1c is a radio-over-fiber (ROF) system with a configuration of a passive optical network (PON). The communication system 1c includes an access point 2c and wireless terminals 3-1 to 3-N. The access point 2c is a communication device that connects one or more wireless terminals 3 to a predetermined network through wireless communication.

The access point 2c includes an accommodation station device 20c, an optical fiber 21, an optical splitter 22, and extension station devices 23c-1 to 23c-M. Each extension station device 23c includes an optical demultiplexer 230c, one or more optical switches 232, and one or more optical detectors 231.

The optical demultiplexer 230c is an optical demultiplexer for fixed wavelengths. The optical demultiplexer 230c outputs the optical signal with the wavelength "$\lambda_1$" and the optical signal with the wavelength "$\lambda_2$" to the optical switch 232. The optical switch 232 outputs, to the optical detector 231, the optical signal with the selected wavelength of the wavelength "$\lambda_1$" and the wavelength "$\lambda_2$". The optical detector 231 transmits a radio-wave signal according to the optical signal with the selected wavelength, at a predetermined frequency, from an antenna of the optical detector 231-m. Note that all optical fibers between the optical demultiplexer 230c and the optical switches 232 have the same length.

As described above, each extension station device 23c in the sixth embodiment includes the one or more optical switches 232 and the one or more optical detectors 231. The optical detector 231 transmits a radio-wave signal according to an optical signal of a selected wavelength, at a predetermined frequency, from an antenna of the optical detector 231-m. Thus, it is possible to estimate the optical fiber length "l" between the accommodation station device 20c and any extension station device 23c, without the extension station device 23c including the signal processing unit 201.

Seventh Embodiment

A seventh embodiment is different from the first embodiment in a point that transmission time periods "$t_r$" of radio-wave signals in a wireless segment are not constant. In the seventh embodiment, the point different from the first embodiment will be described.

When transmission time periods "$t_r$" of radio-wave signals in the wireless segment are not constant due to movement of the wireless terminal 3, an error in estimation of the optical fiber length "l" occurs according to a movement distance over which the wireless terminal 3 has moved. Accordingly, an allowance for the movement distance, or a movement speed, of the wireless terminal 3 is set, depending on an estimation error allowed in the communication system 1a. The wireless terminal 3 moves within a range of the allowance for the movement distance or the movement speed. The accommodation station device 20a estimates the optical fiber length "l", based on optical signals received from an extension station device 23a that is communicating with the wireless terminal 3 moving within the range of the allowance.

As described above, the optical fiber length derivation unit 207 in the seventh embodiment derives the optical fiber length "l", based on the optical signals received from the extension station device 23a that is communicating with the wireless terminal 3 moving within the range of the allowance. The optical fiber length derivation unit 207 determines whether or not the wireless terminal 3 moves within the range of the allowance, for example, based on a result of positioning by a positioning system that uses radio waves transmitted from artificial satellites. Thus, it is possible to estimate the optical fiber length "l" between the accommodation station device and any extension station device, without the extension station device 23a including the signal processing unit 201. Note that each embodiment may be combined with one another.

Although the embodiments of the present invention have been described above with reference to the drawings, specific configurations are not limited to such embodiments, and include designs and the like within a scope that does not depart from the gist of the present invention.

INDUSTRIAL APPLICABILITY

The present invention is applicable to optical wireless communication systems.

REFERENCE SIGNS LIST 1a, 1b, 1c Communication system
2a, 2b Access point
3 Wireless terminal
20a, 20b, 20c Accommodation station device
21 Optical fiber
22 Optical splitter
23a, 23b, 23c Extension station device
30 Control unit
31 Signal processing unit
201 Signal processing unit
202 Multi-wavelength light source
203 Optical modulator
204 Demultiplexer
205 Detector
206 Transmission time period derivation unit
207 Optical fiber length derivation unit
208 Control unit
209 Fiber information storage unit
210 Light source
211 Optical multiplexer
230a, 230b, 230c Optical demultiplexer
231 Optical detector
232 Optical switch

The invention claimed is:

1. A derivation method performed by a communication system including an access point and a wireless terminal, the access point including an accommodation station device and an extension station device connected to each other through an optical fiber transmitting an optical signal, and the wireless terminal communicating with the extension station device by using a radio-wave signal, the derivation method comprising:
- transmitting, to the wireless terminal, a first radio-wave signal according to an optical signal with a first wavelength, and a second radio-wave signal according to an optical signal with a second wavelength;
- acquiring information on a first communication start time that is a time at which communication using the optical signal with the first wavelength is started in the accommodation station device, and information on a second communication start time that is a time at which communication using the optical signal with the second wavelength is started in the accommodation station device;
- acquiring information on a first reception time that is a reception time related to the first radio-wave signal in the accommodation station device, and information on a second reception time that is a reception time related to the second radio-wave signal in the accommodation station device;
- deriving a first round trip time that is a time period from the first communication start time until the first reception time, and deriving a second round trip time that is a time period from the second communication start time until the second reception time; and
- deriving a length of the optical fiber, based on the first round trip time, the second round trip time, a group velocity or a group delay time of the optical signal with the first wavelength, and a group velocity or a group delay time of the optical signal with the second wavelength.

2. The derivation method according to claim 1, further comprising:
- deriving the length of the optical fiber, based on a difference between the first round trip time and the second round trip time, the group velocity or the group delay time of the optical signal with the first wavelength, and the group velocity or the group delay time of the optical signal with the second wavelength.

3. The derivation method according to claim 1, further comprising:
- deriving the length of the optical fiber, based on a difference between the first round trip time and the second round trip time, the group velocity or the group delay time of the optical signal with the first wavelength, the group velocity or the group delay time of the optical signal with the second wavelength, a group velocity or a group delay time of an optical signal with a third wavelength, and a group velocity or a group delay time of an optical signal with a fourth wavelength.

4. A communication system, comprising:
- an access point including an accommodation station device and an extension station device connected to each other through an optical fiber transmitting an optical signal; and
- a wireless terminal that communicates with the extension station device by using a radio-wave signal,
- wherein the accommodation station device includes
- a transmitter that transmits, to the wireless terminal, a first radio-wave signal according to an optical signal with a first wavelength, and a second radio-wave signal according to an optical signal with a second wavelength,
- a communication start time information acquisitor that acquires information on a first communication start time that is a time at which communication using the optical signal with the first wavelength is started in the accommodation station device, and information on a second communication start time that is a time at which communication using the optical signal with the second wavelength is started in the accommodation station device,
- a reception time information acquisitor that acquires information on a first reception time that is a reception time related to the first radio-wave signal in the accommodation station device, and information on a second reception time that is a reception time related to the second radio-wave signal in the accommodation station device,
- a transmission time period derivator that derives a first round trip time that is a time period from the first communication start time until the first reception time, and derives a second round trip time that is a time period from the second communication start time until the second reception time, and
- an optical fiber length derivator that derives a length of the optical fiber, based on the first round trip time, the second round trip time, a group velocity or a group delay time of the optical signal with the first wavelength, and a group velocity or a group delay time of the optical signal with the second wavelength,
- wherein each of the transmitter, the communication start time information acquisitor, the reception time information acquisitor, the transmission time period derivator, and the optical fiber length derivator is implemented by:
  i) computer executable instructions executed by at least one processor,
  ii) at least one circuitry or
  iii) a combination of computer executable instructions executed by at least one processor and at least one circuitry.

5. An accommodation station device in a communication system including an access point and a wireless terminal, the access point including the accommodation station device and an extension station device connected to each other through an optical fiber transmitting an optical signal, and the wireless terminal communicating with the extension station device by using a radio-wave signal, the accommodation station device comprising:
- a transmitter that transmits, to the wireless terminal, a first radio-wave signal according to an optical signal with a first wavelength, and a second radio-wave signal according to an optical signal with a second wavelength;
- a communication start time information acquisitor that acquires information on a first communication start time that is a time at which communication using the optical signal with the first wavelength is started in the accommodation station device, and information on a second communication start time that is a time at which communication using the optical signal with the second wavelength is started in the accommodation station device;
- a reception time information acquisitor that acquires information on a first reception time that is a reception time related to the first radio-wave signal in the accommodation station device, and information on a second reception time that is a reception time related to the second radio-wave signal in the accommodation station device;

a transmission time period derivator that derives a first round trip time that is a time period from the first communication start time until the first reception time, and derives a second round trip time that is a time period from the second communication start time until the second reception time; and an optical fiber length derivator that derives a length of the optical fiber, based on the first round trip time, the second round trip time, a group velocity or a group delay time of the optical signal with the first wavelength, and a group velocity or a group delay time of the optical signal with the second wavelength, wherein each of the transmitter, the communication start time information acquisitor, the reception time information acquisitor, the transmission time period derivator, and the optical fiber length derivator is implemented by:

i) computer executable instructions executed by at least one processor, ii) at least one circuitry or iii) a combination of computer executable instructions executed by at least one processor and at least one circuitry.

* * * * *